(12) United States Patent
Capasso et al.

(10) Patent No.: US 9,265,286 B2
(45) Date of Patent: Feb. 23, 2016

(54) FILTRATION AGENTS AND METHODS OF USE THEREOF

(75) Inventors: Corey Capasso, Woodcliff Lake, NJ (US); Nicholas V. Cozzi, Slinger, WI (US); Alex Freylikhman, Woodcliff Lake, NJ (US)

(73) Assignee: Tersus, LLC, Woodcliff Lake, NJ (US)

( * ) Notice: Subject to any disclaimer, the term of this patent is extended or adjusted under 35 U.S.C. 154(b) by 1029 days.

(21) Appl. No.: 13/254,692

(22) PCT Filed: Mar. 2, 2010

(86) PCT No.: PCT/US2010/025921
§ 371 (c)(1),
(2), (4) Date: Mar. 20, 2012

(87) PCT Pub. No.: WO2010/101918
PCT Pub. Date: Sep. 10, 2010

(65) Prior Publication Data
US 2012/0167903 A1    Jul. 5, 2012

Related U.S. Application Data

(60) Provisional application No. 61/156,801, filed on Mar. 2, 2009.

(51) Int. Cl.
*A24F 1/14* (2006.01)
*A24D 3/08* (2006.01)
*B01D 53/02* (2006.01)

(52) U.S. Cl.
CPC *A24D 3/08* (2013.01); *B01D 53/02* (2013.01); *B01D 2253/202* (2013.01); *B01D 2253/302* (2013.01)

(58) Field of Classification Search
CPC ..... A24D 3/08; B01D 53/02; B01D 2253/302
See application file for complete search history.

(56) References Cited

U.S. PATENT DOCUMENTS

| | | |
|---|---|---|
| 4,031,906 A | 6/1977 | Knapp |
| 4,111,214 A | 9/1978 | Flesher |
| 4,133,318 A | 1/1979 | Gross et al. |
| 4,148,326 A | 4/1979 | Harbaugh |
| 4,148,327 A | 4/1979 | Graham |
| 4,170,237 A | 10/1979 | Epstein |
| 4,171,703 A | 10/1979 | Locke |
| 4,183,365 A | 1/1980 | Kelley |
| 4,203,455 A | 5/1980 | Byrd, Jr. |
| 4,216,785 A | 8/1980 | Erickson et al. |
| 4,223,686 A | 9/1980 | Murray, Jr. |
| 4,241,741 A | 12/1980 | Cabados et al. |
| 4,253,475 A | 3/1981 | Schreiber et al. |
| 4,273,142 A | 6/1981 | Swanson et al. |
| 4,357,948 A | 11/1982 | Schweitzer et al. |
| 4,414,988 A | 11/1983 | Yagi |
| 4,638,815 A | 1/1987 | Yoshioka |
| 4,865,056 A | 9/1989 | Tamaoki et al. |
| 5,080,113 A | 1/1992 | Bui |
| D342,805 S | 12/1993 | Heine et al. |
| D349,780 S | 8/1994 | Heine |
| D350,411 S | 9/1994 | Heine |
| D358,227 S | 5/1995 | Heine |
| D358,228 S | 5/1995 | Heine |
| D358,229 S | 5/1995 | Heine |
| 5,476,110 A | 12/1995 | Baig et al. |
| D368,325 S | 3/1996 | Heine |
| D376,033 S | 11/1996 | Heine |
| D381,116 S | 7/1997 | Richards |
| D403,106 S | 12/1998 | Barmes |
| 6,067,993 A | 5/2000 | Mahoney, III |
| 6,073,632 A | 6/2000 | Tolja |
| 6,568,400 B1 | 5/2003 | Tinsky et al. |
| D539,978 S | 4/2007 | Kassir |
| D547,489 S | 7/2007 | Kassir |
| D547,902 S | 7/2007 | Kassir |
| D548,398 S | 8/2007 | Chaoui |
| 7,287,530 B1 | 10/2007 | Stuart |
| D554,797 S | 11/2007 | Kassir |
| D558,919 S | 1/2008 | Kassir |
| D561,388 S | 2/2008 | Kassir |
| 7,404,405 B1 | 7/2008 | Mehio |
| D584,853 S | 1/2009 | Kassir |
| 2004/0237984 A1 | 12/2004 | Figlar et al. |
| 2007/0186945 A1 | 8/2007 | Olegario et al. |

OTHER PUBLICATIONS

International Search Report and Written Opinion dated Apr. 15, 2010 issued in related PCT Application No. PCT/US10/25921, filed Mar. 2, 2010, 11 pages.
Novotny et al., A possible chemical basis for the higher mutagenicity of marijuana smoke as compared to tobacco smoke, Experientia, 1976, pp. 280-282, vol. 32, No. 3.
Roberts et al., Isolation and identification of flavor components of burley tobacco, Tobacco Science, 1972, pp. 107-112, vol. 16.

*Primary Examiner* — Michael H Wilson
*Assistant Examiner* — Dionne Walls Mayes
(74) *Attorney, Agent, or Firm* — Dentons US LLP

(57) ABSTRACT

Provided herein are compositions for removal of contaminants from an air stream. The composition contains a filtration agent having one or more components that can adsorb tar or other contaminants from smoke. Also provided is a method for removing a contaminant from an air stream. Also provided are a system and a kit employing the filtration agent.

19 Claims, 1 Drawing Sheet

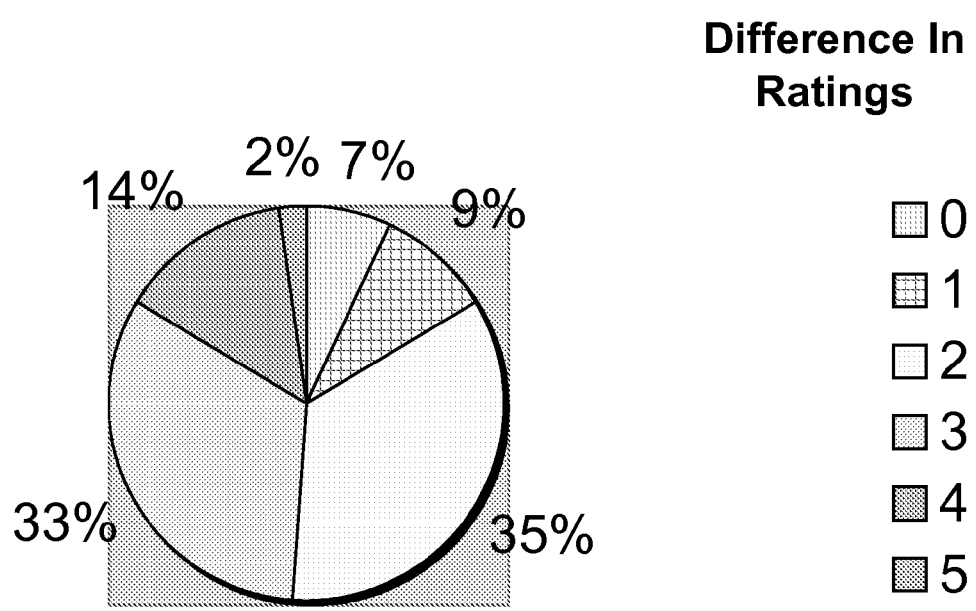

FILTRATION AGENTS AND METHODS OF USE THEREOF

CROSS-REFERENCE TO RELATED APPLICATIONS

The present application is the United States 371 national stage of PCT International Application No. PCT/US10/25921, filed Mar. 2, 2010, which claims the benefit of U.S. Provisional Application Ser. No. 61/156,801, filed on Mar. 2, 2009, each of which is incorporated herein by reference in its entirety.

FIELD OF THE INVENTION

The present invention generally relates to removal of contaminants from an air stream. More specifically, the present invention relates to removal of chemicals having an effect on health from smoke of combusted plant material.

BACKGROUND

Smoked produced from the combustion of plant material, such as tobacco or medical marijuana, contains thousands of chemicals, many with varying adverse health effects. For example, it is estimated that tobacco smoke contains over 4000 chemicals of which at least 250 are known to be toxic or carcinogenic contaminants. Chemicals in tobacco smoke identified as being carcinogenic include, but are not limited to, tar, hydrogen cyanide, carbon monoxide, butane, ammonia, toulene, arsenic, lead, chromium, cadmium, polycyclic aromatic hydrocarbons (PAHs), N-nitrosamines, aromatic amines, aldehydes, and benzenes.

Tar, in the context of tobacco smoke, generally refers to the collection of solid particles in the smoke. Tar includes the majority of the toxic and carcinogenic compounds in tobacco smoke that, when inhaled by the smoker, can lead to numerous health ailments. When tar is inhaled, it condenses and is deposited inside the lungs of the user where it can paralyze the cilia in the lungs. The mutagenic and carcinogenic chemicals in tar can contribute to various health conditions including blood vessel disease, lung cancer, stroke, emphysema and chronic bronchitis. Not only does smoking increase the risk of lung cancer, but also cancers of the lip, mouth, throat, larynx, esophagus, pancreas, kidney, and bladder.

Attempts to reduce the amount of toxic and carcinogenic chemicals that reach the smoker include tobacco smoke filters positioned between the burning tobacco and the smoker. For example, filters in cigarettes are typically made of cellulose acetate, with or without activated charcoal, which removes a portion of the tar in the tobacco smoke. Filter-tipped cigarettes are commonplace with the majority of smokers buying filter-tipped cigarettes.

In a water pipe, the water does not filter out much of the toxic and harmful chemicals from smoked tobacco, despite a common misconception otherwise. Similar to cigarettes, smoke filters have been positioned at the tip of the hose between the burning tobacco and the smoker. Smoking tobacco through a water pipe first originated in India and then eventually spread to the Middle East where it has been a part of cultural tradition for centuries. In the United States, use of water pipes has become increasingly popular. Though the water and hose filter may filter out some of the toxic chemicals, an additional filtration agent is needed.

SUMMARY OF THE INVENTION

The present invention relates to compositions and methods for the removal of contaminants from an air stream. More specifically, the present invention relates to removal of chemicals having an effect on health, such as carcinogens, from smoke of combusted plant material.

One aspect provides a composition for the removal of contaminants from an air stream. The composition comprises a filtration agent. The filtration agent comprises an adsorptive agent having an affinity for a non-polar compound present in smoke from a combusted plant material.

Another aspect provides a method for removing a contaminant from an air stream. The method comprises combusting a plant material to produce smoke. The method comprises contacting a filtration agent with the smoke. The filtration agent comprises an adsorptive agent having an affinity for non-polar compounds. The adsorptive agent substantially adsorbs non-polar contaminants from the smoke.

Another aspect provides a system for inhaling smoke from a combusted plant material. The system comprises a bowl; a stem pipe; a water reservoir; an inhalation tube; optionally, a combustible plant material, wherein the combustible plant material is within the bowl when present; and optionally, water, wherein the water fills the water reservoir to about a water line when present; and a filtration agent comprising an adsorptive agent having an affinity for a non-polar compound present in smoke from a combusted plant material. The bowl is fluidically connected to the stem pipe; the stem pipe is extends below a water line of the water reservoir; the inhalation tube extends above the water line of the water reservoir; and the filtration agent is within the water reservoir.

Another aspect provides a kit for the removal of contaminants from an air stream. The kit comprises a filtration agent and one or more of a combustible plant material, a disposal bag, a flame source, disposable gloves, a coloring agent, a flavoring agent, an aesthetic additives, a pH buffer, charcoal, a hookah screen, a bowl, or a pipe component. The filtration agent comprises an adsorptive agent having an affinity for a non-polar compound present in smoke from a combusted plant material.

In some embodiments, the plant material is a tobacco or a medical marijuana.

In some embodiments, the filtration agent comprises a plurality of adsorptive agents. In some embodiments, the filtration agent comprises an adsorptive agent having an affinity for a non-polar nonionic compound present in smoke from a combusted plant material. In some embodiments, the adsorptive agent material is selected from the group consisting of a poly(4-ethylstyrene-co-divinylbenzene) polymer; a poly(styrene-co-divinylbenzene) polymer; and a sytrene/divinylbenzene polyaromatic polymer. In some embodiments, the adsorptive agent comprises at least two of a poly(4-ethylstyrene-co-divinylbenzene) polymer; a poly(styrene-co-divinylbenzene) polymer; or a sytrene/divinylbenzene polyaromatic polymer. In some embodiments, the adsorptive agent comprises a poly(4-ethylstyrene-co-divinylbenzene) polymer; a poly(styrene-co-divinylbenzene) polymer; and a sytrene/divinylbenzene polyaromatic polymer.

In some embodiments, the adsorptive agent comprises a material having a size of at least about 1 µm. In some embodiments, the adsorptive agent comprises a material having a size of up to about 10,000 µm. In some embodiments, the adsorptive agent comprises a material having a size of at least about 1 µm up to about 10,000 µm; at least about 10 µm up to about 8,000 µm; at least about 100 µm up to about 5,000 µm; at least about 200 µm up to about 2,000 µm; or at least about 250 µm up to about 1,200 µm. In some embodiments, the adsorptive agent comprises a material having a size of at least about 20 mesh up to about 50 mesh.

In some embodiments, the filtration agent comprises a material that changes color according to an amount of tar bound. In some embodiments, the filtration agent comprises a material having a density less than, about the same, or greater than water. In some embodiments, the filtration agent comprises a material that is substantially non-water solvent. In some embodiments, the filtration agent is substantially non-toxic and ingestable. In some embodiments, the filtration agent comprises at least one of a color agent, a pH buffer, or a flavor agent.

In some embodiments, the filtration agent comprises an adsorptive material that can bind at least one tobacco smoke contaminant selected from the group consisting of an alkane, an alkene, a cycloalkane, an aromatic, a polycyclic aromatic, and a terpene hydrocarbon. In some configurations, the alkane is selected from the group consisting of $C_8H_{18}$, $C_9H_{20}$, $C_{10}H_{22}$, $C_{11}H_{24}$, $C_{12}H_{26}$, $C_{13}H_{28}$, $C_{14}H_{30}$, $C_{15}H_{32}$, $C_{16}H_{34}$, $C_{17}H_{36}$, $C_{18}H_{38}$, $C_{19}H_{40}$, $C_{20}H_{42}$, $C_{21}H_{44}$, $C_{22}H_{46}$, $C_{23}H_{48}$, $C_{24}H_{50}$, $C_{25}H_{52}$, $C_{26}H_{54}$, $C_{27}H_{56}$, and $C_{28}H_{58}$. In some configurations, the alkene or cycloalkane is selected from the group consisting of $C_9H_{18}$, $C_{10}H_{20}$, $C_{11}H_{22}$, $C_{12}H_{24}$, $C_{13}H_{26}$, $C_{14}H_{28}$, $C_{15}H_{30}$, $C_{16}H_{32}$, $C_{17}H_{34}$, $C_{18}H_{36}$, $C_{19}H_{38}$, $C_{20}H_{40}$, $C_{21}H_{42}$, $C_{22}H_{44}$, $C_{23}H_{46}$, $C_{24}H_{48}$, $C_{25}H_{50}$, $C_{26}H_{52}$, $C_{27}H_{54}$, and $C_{28}H_{58}$. In some configurations, the aromatic is selected from the group consisting of $C_7H_8$, $C_{18}H_{10}$, $C_9H_{12}$, $C_{10}H_{14}$, $C_{14}H_{16}$, $C_{12}H_{18}$, $C_{13}H_{20}$, $C_{14}H_{22}$, $C_{15}H_{24}$, $C_{16}H_{26}$, $C_{17}H_{28}$, $C_{18}H_{30}$, $C_{19}H_{32}$, $C_{20}H_{34}$, $C_8H_8$, $C_9H_{10}$, $C_{10}H_{12}$, $C_{11}H_{14}$, $C_{12}H_{16}$, $C_{13}H_{18}$, $C_{14}H_{20}$, $C_{15}H_{22}$, and $C_{16}H_{24}$. In some configurations, the polycyclic aromatic is selected from the group consisting of $C_nH_{2n-12}$, $C_nH_{2n-14}$, $C_nH_{2n-16}$, $C_nH_{2n-18}$, $C_nH_{2n-20}$, $C_nH_{2n-22}$, napthalene, biphenyl, acenaphthene, alkenylnapthalene, fluorene, dihydroanthracene, dihydrophenanthrene, anthracene, phenanthrene, alkenylanthracene, alkenylphenanthrene, fluoranthene, and pyrene. In some configurations, the terpene is selected from the group consisting of $C_{10}H_{16}$, $C_{15}H_{24}$, $C_{20}H_{38}$, $C_{20}H_{30}$, caniphene, α-fenchene, α-terpinene, d-limonene, α-terpinolene, Z-β-ocimene, γ-terpinene, β-elemene, γ-elemene, α-farnesene, thujopsene, and δ-gurjunene.

In some embodiments, the filtration agent comprises an adsorptive agent that can bind at least one medical marijuana smoke contaminant selected from the group consisting of an alkane, an alkene, a cycloalkane, an aromatic, a polycyclic aromatic, and a terpene hydrocarbon. In some configurations, the alkane is selected from the group consisting of pentadecane, heptadecane, hexadecane, octadecane, heneicosane, nonadecane, docosane, tricosane, hexacosane, heptacosane, and eicosane. In some configurations, the alkene is selected from the group consisting of nonadecene, (Z)-3-hexadecene, 1-pentadecene, 1-nonadecene, 1-octadecene, 3-eicosene, (Z)-9-tricosene, and (E)-3-eicosene. In some configurations, the cycloalkane is selected from the group consisting of cyclododecane, cyclohexadecane, 1,7,11-trimethyl-cyclotetradecane, and 1-(1,5-dimethylhexyl)-cyclohexane. In some configurations, the polycyclic aromatic is selected from the group consisting of pyrene, benzo [a] fluorene, benzo [a] anthracene, chrysene, benzo [j] fluoroanthene, benzo [k] fluoranthene, benzo [a] pyrene, perylene, dibenz [a, i] anthracene, benzo [ghi] perylene, anthanthrene, and 2 dibenzopyrenes. In some configurations, the terpene is caryophyllene.

In some embodiments, an adsorptive agent material does not bind at least one of nicotine, tetrahydrocannabinol (THC), cannabidiol, or cannabinol.

In some embodiments, the filtration agent is present in an amount of at least about 0.2 grams per liter of water; at least about 0.4 grams per liter of water; at least about 0.6 grams per liter of water; at least about 0.8 grams per liter of water; at least about 1 gram per liter of water; at least about 1.5 grams per liter of water; at least about 2 grams per liter of water; at least about 2.5 grams per liter of water; at least about 3 grams per liter of water; at least about 3.5 grams per liter of water; at least about 4 grams per liter of water; at least about 4.5 grams per liter of water; at least about 5 grams per liter of water; at least about 5.5 grams per liter of water; at least about 6 grams per liter of water; at least about 6.5 grams per liter of water; at least about 7 grams per liter of water; at least about 7.5 grams per liter of water; at least about 8 grams per liter of water; at least about 8.5 grams per liter of water; at least about 9 grams per liter of water; at least about 9.5 grams per liter of water; or at least about 10 grams per liter of water.

In some embodiments, the filtration agent is present in an amount sufficient to provide the adsorptive agent in an amount of at least about 0.5 grams per liter of water up to about 10 grams per liter of water; at least about 1 grams per liter of water up to about 9 grams per liter of water; at least about 2 gram per liter of water up to about 8 grams per liter of water; at least about 3 grams per liter of water up to about 7 grams per liter of water; or at least about 4 grams per liter of water up to about 6 grams per liter of water.

In some embodiments, the filtration agent comprises an adsorptive agent that can bind at least about 10 mg tar per 1 g of filtration agent; at least about 12 mg tar per 1 g of filtration agent; at least about 14 mg tar per 1 g of filtration agent; at least about 16 mg tar per 1 g of filtration agent; at least about 18 mg tar per 1 g of filtration agent; at least about 20 mg tar per 1 g of filtration agent; at least about 22 mg tar per 1 g of filtration agent; at least about 24 mg tar per 1 g of filtration agent; at least about 26 mg tar per 1 g of filtration agent; at least about 28 mg tar per 1 g of filtration agent; at least about 30 mg tar per 1 g of filtration agent; at least about 32 mg tar per 1 g of filtration agent; at least about 34 mg tar per 1 g of filtration agent; at least about 36 mg tar per 1 g of filtration agent; at least about 38 mg tar per 1 g of filtration agent; or at least about 40 mg tar per 1 g of filtration agent.

In some embodiments, the filtration agent is present in an amount of at least about 0.1 g of adsorptive agent for about 1 g of tobacco; at least about 0.2 g of adsorptive agent for about 1 g of tobacco; at least about 0.3 g of adsorptive agent for about 1 g of tobacco; at least about 0.4 g of adsorptive agent for about 1 g of tobacco; at least about 0.5 g of adsorptive agent for about 1 g of tobacco; at least about 0.6 g of adsorptive agent for about 1 g of tobacco; at least about 0.7 g of adsorptive agent for about 1 g of tobacco; at least about 0.8 g of adsorptive agent for about 1 g of tobacco; at least about 0.9 g of adsorptive agent for about 1 g of tobacco; at least about 1 g of adsorptive agent for about 1 g of tobacco; at least about 1.1 g of adsorptive agent for about 1 g of tobacco; at least about 1.2 g of adsorptive agent for about 1 g of tobacco; at least about 1.3 g of adsorptive agent for about 1 g of tobacco; at least about 1.4 g of adsorptive agent for about 1 g of tobacco; at least about 1.5 g of adsorptive agent for about 1 g of tobacco; at least about 1.6 g of adsorptive agent for about 1 g of tobacco; at least about 1.7 g of adsorptive agent for about 1 g of tobacco; at least about 1.8 g of adsorptive agent for about 1 g of tobacco; at least about 1.9 g of adsorptive agent for about 1 g of tobacco; or at least about 2 g of adsorptive agent for about 1 g of tobacco.

In some embodiments, the filtration agent is present in an amount of at least about 0.1 g to about 1 g of adsorptive agent for about 1 g of tobacco; at least about 0.2 g to about 0.8 g of adsorptive agent for about 1 g of tobacco; at least about 0.3 g to about 0.7 g of adsorptive agent for about 1 g of tobacco; or at least about 0.4 g to about 0.6 g of adsorptive agent for about 1 g of tobacco.

In some embodiments, the filtration agent reduces smoke acridity by at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95%.

In some embodiments, the filtration agent increases smoothness of smoke by at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95%.

In some embodiments, the filtration agent increases ease of smoke inhalation by at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95%.

Other objects and features will be in part apparent and in part pointed out hereinafter.

BRIEF DESCRIPTION OF THE DRAWINGS

Those of skill in the art will understand that the drawings, described below, are for illustrative purposes only. The drawings are not intended to limit the scope of the present teachings in any way.

FIG. 1 is a pie chart showing the difference in ratings of smoothness as a percentage of the forty-three subjects surveyed. Additional details regarding methodology are available in Example 3.

DETAILED DESCRIPTION OF THE INVENTION

The present invention is based, at least in part, on the discovery of filtration agents that can bind carcinogens, such as tar, thereby removing it from the inhaled smoke. Various aspects of the present invention comprise compositions and methods for the removal of contaminants from an air stream, especially smoke from combustion of plant material.

One aspect of the invention is a composition for the removal of contaminants from an air stream. Various embodiments provide for a filtration agent that can remove contaminants, such as tar, from smoke produced from the combustion of a plant material, such as tobacco and medical marijuana.

The filtration agent can comprise an adsorptive agent that binds to non-polar compounds in the air stream. Because most if not all components of tar are non-polar, the adsorptive agent can substantially adsorb tar from an smoke-containing air stream.

The adsorptive agent can comprise non-polar material. The adsorptive agent can optionally be nonionic. In some embodiments, the adsorptive agent comprises a non-polar and non-ionic material. The adsorptive agent can comprise a combination of non-polar material and non-polar, nonionic material. Due the adsorptive agent's non-polar properties, it is generally has low or no solubility in water. Preferably, the adsorptive agent is non-soluble in water. In some embodiments, the filtration agent can contain a water soluble component (e.g., a dye, flavor, or other filtration material) and a non-water soluble component.

The non-polar material of the adsorptive agent has an affinity for non-polar compounds. The non-polar, nonionic material has an affinity for non-polar, nonionic compounds. Thus, the non-polar material can absorb non-polar compounds present in an air stream. Similarly, the non-polar, nonionic material can adsorb non-polar, nonionic compounds present in an air stream.

The adsorptive agent can be comprised of a mixture of both non-polar materials and non-polar, nonionic materials, which are capable of binding to non-polar compounds as well as non-polar, nonionic compounds from an air stream.

Suitable adsorptive materials include, but are not limited to, packing material typically used as a stationary phase in liquid chromatography applications. The adsorptive material, such as chromatographic packing material, can be a solid substance in bead form. Examples of materials include, but are not limited to: a poly(4-ethylstyrene-co-divinylbenzene) polymers; poly(styrene-co-divinylbenzene) polymers; and sytrene/divinylbenzene polyaromatic polymers. In various embodiments, the adsorptive agent can comprise at least one of a poly(4-ethylstyrene-co-divinylbenzene) polymer; a poly (styrene-co-divinylbenzene) polymer; and a sytrene/divinylbenzene polyaromatic polymer. For example, the adsorptive agent can comprise at least two of a poly(4-ethylstyrene-co-divinylbenzene) polymer, a poly(styrene-co-divinylbenzene) polymer, and a sytrene/divinylbenzene polyaromatic polymer. As another example, the adsorptive agent can comprise at least three of a poly(4-ethylstyrene-co-divinylbenzene) polymer, a poly(styrene-co-divinylbenzene) polymer, and a sytrene/divinylbenzene polyaromatic polymer.

Commercially available materials for use in an adsorptive agent include, but are not limited to Aldrich 426962 (Poly(4-ethylstyrene-co-divinylbenzene); Aldrich 426989 (poly(styrene-co-divinylbenzene)); Amberlite XAD1180 (Aldrich 10377) (styrene/divinylbenzene polyaromatic); Amberlite XAD16 (Aldrich 436720) (polystyrene); and Amberlite XAD2 (Supelco 20275). Non-limiting examples of non-polar commercially available adsorptive materials for use in a filtration agent include packing materials Aldrich 426962 and Aldrich 426989. Non-limiting examples of non-polar, non-ionic commercially available adsorptive materials for use in a filtration agent include Amberlite XAD1180 (Aldrich 10377), Amberlite XAD16 (Aldrich 436720), and Amberlite XAD2 (Supelco 20275).

An adsorptive agent material can be selected for inclusion in the filtration agent based upon affinity or specificity for a desired target. In some embodiments, various adsorptive agent materials are selected for affinity to one or more toxic or carcinogenic components of smoke. A filtration agent can comprise a plurality of materials, each selected for a particular target component.

An adsorptive agent material can be selected so as to not bind to desirable compounds. For example, nitrogen-containing compounds (which are generally polar) in smoke are associated with flavor. An adsorptive agent selected to bond non-polar compounds will not substantially remove flavor associated nitrogen-containing polar compounds. Nonetheless, an adsorptive agent material can be selected to have further reduced affinity for desirable compounds in the smoke.

Adsorptive agent materials are generally macroscopic. Adsorptive agent materials can be at least about 1 µm in size. An adsorptive agent material smaller than about 1 µm is usually avoided because it may reach the aveoli if inhaled.

Adsorptive agent materials can be up to about 10,000 µm in size. In some embodiments, an adsorptive agent material can be at least about 1 µm up to about can be from about the In one embodiment, the adsorptive agent can be from about 10,000 µm in size. For example, an adsorptive agent material can be at least about 10 µm up to about 8,000 µm in size. As another example, an adsorptive agent material can be at least about 100 µm up to about 5,000 µm in size. As another example, an adsorptive agent material can be at least about 200 µm up to about 2,000 µm in size. Preferably, an adsorptive agent material is at least about 250 µm up to about 1200 µm in size. Adsorptive agent materials are commonly referred to in "mesh" size. Conversion between metric and mesh size is within the ordinary skill in the art. For example, a preferred adsorptive agent material can be at least about 20 mesh up to about 50 mesh.

Adsorptive agent materials can be present in a variety of sizes or shapes. For example, one type of adsorptive agent material can be present in a range of particle sizes. Such size variation can provide different binding characteristics. Such size variation can provide an aesthetic appeal to a user. As another example, one type of adsorptive agent material can be present in a range of shapes. Such shape variation can provide different binding characteristics. Such shape variation can provide an aesthetic appeal to a user. As another example, one type of adsorptive agent material can be present in a variety of sizes and shapes. Furthermore, differing adsorptive agent materials can be present in a variety of different sizes or shapes.

Adsorptive agent materials can have various densities depending on the particular embodiment being implemented. In some applications, an adsorptive agent material can have a density less than that of the aqueous medium so that the material floats. For example, adsorptive agent material Aldrich 426962 would float in water. In other applications, an adsorptive agent material can have a density greater than that of the aqueous medium so that the material sinks. For example, adsorptive agent materials XAD1180 or XAD2 would sink in water. In further applications, an adsorptive agent material can have a density about the same as that of the aqueous medium so that the material is substantially suspended. It is contemplated that an adsorptive agent can comprise a plurality of materials having the same, similar, or different densities.

The density of an adsorptive agent material can change upon binding of contaminants. For example, an unbound adsorptive agent material that floats in water can sink upon binding some sufficient amount of tar from cigarette smoke. In such embodiments, sinking of an adsorptive agent can serve as an indicator to change or supplement the water with additional unbound adsorptive agent.

The color of an adsorptive agent material can change upon binding of contaminants. For example, an unbound adsorptive agent material can be white and a bound adsorptive material can be a darker color, such as brown or black. It is contemplated that other discernable color changes can occur upon binding of contaminants. In such embodiments, color change of an adsorptive agent can serve as an indicator to change or supplement the water with additional unbound adsorptive agent, as discussed in further detail below.

A filtration agent, and components thereof such as an adsorptive agent material, described herein is generally a safe and non-toxic material. Preferably, a filtration agent material is inert and safe to handle. Preferably, a filtration agent material has no restrictions on storage or disposal. Components of a filtration agent are preferably at least about 1 µm so as to protect against inhalation hazards.

After an adsorptive agent material is bound with tar, or other potentially toxic or carcinogenic components, the bound material is usually handled with suitable precautions, such as gloves.

A filtration agent can comprise additional components.

The filtration agent can comprise a buffering agent. Ash introduced into a water reservoir of a water pipe or hookah can increase the pH of the water. A buffering agent can stabilize pH changes, which in turn can help ensure optimal binding of adsorptive agent materials and smoke components.

A filtration agent can comprise a color agent. A color agent can provide aesthetic appeal to a water pipe or hookah user by at least partially masking the discoloration of water typical of use. A filtration agent can include other aesthetic components such as a reflective material (e.g., glitter).

A filtration agent can comprise charcoal, for example an activated charcoal. The porosity of activated charcoal provides an ability to readily adsorb gases and liquids so as to filter water or adsorb odors.

A filtration agent can comprise one or more flavor additives.

A filtration agent, or components thereof such as an adsorptive agent, can be selected or formulated to have an affinity for contaminants according to chemical nature and mass.

An adsorptive agent can have an affinity for contaminants that are non-polar compounds with a molecular weight of up to about 20,000 g/mol. An adsorptive agent can have an affinity for contaminants that are non-polar, nonionic compounds with a molecular weight of up to about 20,000 g/mol. Both tobacco smoke and marijuana smoke contain toxic and carcinogenic, non-polar compounds including tar. Target contaminants can be identified according to methods conventional in the art (see e.g., Roberts and Rohde, Tobacco Science 107, 581108027-581108032; Novotny et al. (1976) Experientia 32(3), 280-282)

Thus, an adsorptive agent can adsorb non-polar contaminants in smoke produced from the combustion of plant material. The combusted plant material can comprise tobacco. The combusted plant material can comprise marijuana, such as medical marijuana. Both tobacco smoke and marijuana smoke contain toxic and carcinogenic, non-polar compounds. For example, benzo[a] pyrene, a non-polar aromatic compound found in tobacco smoke, is a carcinogen that can cause tumor growth in the lungs. Tobacco smoke and marijuana smoke can also contain tar, which includes carcinogenic and toxic, non-polar compounds.

An adsorptive agent as described herein can bind and remove various non-polar, hydrocarbon compounds from Tobacco smoke. It is estimated that there are over 755 hydrocarbons in tobacco and tobacco smoke. Hydrocarbons that can be bound and removed from Tobacco smoke by an adsorptive agent described herein include, but are not limited to, alkane, alkene/cycloalkane, aromatic, polycyclic aromatic, and terpene hydrocarbons.

Examples of alkanes that can be present in tobacco smoke and can be adsorbed by an adsorptive agent include, but are not limited to, $C_8H_{18}$, $C_6H_{20}$, $C_{10}H_{22}$, $C_{11}H_{24}$, $C_{12}H_{26}$, $C_{13}H_{28}$, $C_{14}H_{30}$, $C_{15}H_{32}$, $C_{16}H_{34}$, $C_{17}H_{36}$, $C_{18}H_{38}$, $C_{16}H_{40}$, $C_{20}H_{42}$, $C_{21}H_{44}$, $C_{22}H_{46}$, $C_{23}H_{48}$, $C_{24}H_{50}$, $C_{25}H_{52}$, $C_{26}H_{54}$, $C_{27}H_{56}$, and $C_{28}H_{58}$.

Examples of alkenes/cycloalkanes that can be present in tobacco smoke and can be adsorbed by an adsorptive agent include, but are not limited to, $C_6H_{18}$, $C_{10}H_{20}$, $C_{11}H_{22}$, $C_{12}H_{24}$, $C_{13}H_{26}$, $C_{14}H_{28}$, $C_{15}H_{30}$, $C_{16}H_{32}$, $C_{17}H_{34}$, $C_{18}H_{36}$, $C_{19}H_{38}$, $C_{20}H_{40}$, $C_{21}H_{42}$, $C_{22}H_{44}$, $C_{23}H_{46}$, $C_{24}H_{48}$, $C_{25}H_{50}$, $C_{26}H_{52}$, $C_{27}H_{54}$, and $C_{28}H_{56}$.

Examples of aromatics that can be present in tobacco smoke and can be adsorbed by an adsorptive agent include, but are not limited to, $C_7H_8$, $C_8H_{10}$, $C_6H_{12}$, $C_{10}H_{14}$, $C_{11}H_{16}$, $C_{12}H_{18}$, $C_{13}H_{20}$, $C_{14}H_{22}$, $C_{15}H_{24}$, $C_{16}H_{26}$, $C_{17}H_{28}$, $C_{18}H_{30}$, $C_{19}H_{32}$, $C_{20}H_{34}$, $C_8H_8$, $C_9H_{10}$, $C_{10}H_{12}$, $C_{11}H_{14}$, $C_{12}H_{16}$, $C_{13}H_{18}$, $C_{14}H_{20}$, $C_{15}H_{22}$, and $C_{16}H_{24}$.

Examples of polycyclic aromatics that can be present in tobacco smoke and can be adsorbed by an adsorptive agent include, but are not limited to, $C_nH_{2n-12}$, $C_nH_{2n-14}$, $C_nH_{2n-16}$, $C_nH_{2n-18}$, $C_nH_{2n-20}$, and $C_nH_{2n-22}$.

Examples of polycyclic aromatics, represented by the formula $C_nH_{2n-12}$, that can be present in tobacco smoke and can be adsorbed by an adsorptive agent include, but are not limited to, napthalenes.

Examples of polycyclic aromatics, represented by the formula $C_nH_{2n-14}$, that can be present in tobacco smoke and can be adsorbed by an adsorptive agent include, but are not limited to, biphenyls, acenaphthenes, and alkenylnapthalenes.

Examples of polycyclic aromatics, represented by the formula $C_nH_{2n-16}$, that can be present in tobacco smoke and can be adsorbed by an adsorptive agent include, but are not limited to, fluorenes, dihydroanthracenes, and dihydrophenanthrenes.

Examples of polycyclic aromatics, represented by the formula $C_nH_{2n-18}$, that can be present in tobacco smoke and can be adsorbed by an adsorptive agent include, but are not limited to, anthracenes and phenanthrenes.

Examples of polycyclic aromatics, represented by the formula $C_nH_{2n-20}$, that can be present in tobacco smoke and can be adsorbed by an adsorptive agent include, but are not limited to, alkenylanthracenes and alkenylphenanthrenes.

Examples of polycyclic aromatics, represented by the formula $C_nH_{2n-22}$, that can be present in tobacco smoke and can be adsorbed by an adsorptive agent include, but are not limited to, fluoranthenes and pyrenes.

Examples of terpenes that can be present in tobacco smoke and can be adsorbed by an adsorptive agent include, but are not limited to, $C_{10}H_{16}$, $C_{15}H_{24}$, $C_{20}H_{38}$, and $C_{20}H_{30}$.

Examples of terpenes, represented by the formula $C_{10}H_{16}$, that can be present in the tar of tobacco smoke and can be adsorbed by an adsorptive agent include, but are not limited to, caniphene, α-fenchene, α-terpinene, d-limonene, α-terpinolene, Z-β-ocimene, and γ-terpinene.

Examples of terpenes, represented by the formula $C_{15}H_{24}$, which can be present in the tar of tobacco smoke and can be adsorbed by an adsorptive agent include, but are not limited to, β-elemene, γ-elemene, α-farnesene, thujopsene, and δ-gurjunene.

In some embodiments, an adsorptive agent material is selected so as to not bind nicotine.

The non-polar compounds listed above can be bound to the adsorptive agent according to increasing polarity. Where a target compound is relatively less non-polar than other listed compounds, the amount of adsorptive agent can be increased. Where a target compound is relatively less non-polar than other listed compounds, materials of the adsorptive agent can be selected that have affinity to other chemical characteristics of the target.

An adsorptive agent as described herein can bind and remove various non-polar compounds from Marijuana smoke. The non-polar compounds that can be bound and removed from Marijuana smoke by an adsorptive agent described herein include, but are not limited to, hydrocarbons and other organic compounds. Hydrocarbons that can be bound and removed from Marijuana smoke by an adsorptive agent described herein include, but are not limited to, alkane, alkene, cycloalkane, aromatic, polycyclic aromatic, and terpene hydrocarbons.

Examples of alkanes that can be present in marijuana smoke and can be adsorbed by an adsorptive agent include, but are not limited to, pentadecane, heptadecane, hexadecane, octadecane, heneicosane, nonadecane, docosane, tricosane, hexacosane, heptacosane, and eicosane.

Examples of alkenes that can be present in marijuana smoke and can be adsorbed by an adsorptive agent include, but are not limited to, nonadecene, (Z)-3-hexadecene, 1-pentadecene, 1-nonadecene, 1-octadecene, 3-eicosene, (Z)-9-tricosene, and (E)-3-eicosene.

Examples of cycloalkanes that can be present in marijuana smoke and can be adsorbed by an adsorptive agent include, but are not limited to, cyclododecane, cyclohexadecane, 1,7,11-trimethyl-cyclotetradecane, and 1-(1,5-dimethylhexyl)-cyclohexane.

Examples of polycyclic aromatics that can be present in marijuana smoke and can be adsorbed by an adsorptive agent include, but are not limited to, pyrene, benzo [a] fluorene, benzo [a] anthracene, chrysene, benzo [j] fluoroanthene, benzo [k] fluoranthene, benzo [a] pyrene, perylene, dibenz [a,i] anthracene, benzo [ghi] perylene, anthanthrene, and 2 dibenzopyrenes.

Examples of terpenes that can be present in marijuana smoke and can be adsorbed by an adsorptive agent include, but are not limited to, caryophyllene.

In some embodiments, an adsorptive agent material is selected so as to not bind at least one of tetrahydrocannabinol (THC), cannabidiol, and cannabinol.

The compounds listed above can be bound to an adsorptive agent according to increasing polarity Where a target compound is relatively less non-polar than other listed compounds, the amount of adsorptive agent can be increased. Where a target compound is relatively less non-polar than other listed compounds, materials of the adsorptive agent can be selected that have affinity to other chemical characteristics of the target.

Another aspect provides methods for filtering contaminants from an air stream. A plant material can be combusted to produce smoke. The smoke from combusted plant material and a filtration agent comprising an adsorptive agent described herein can be contacted. An adsorptive agent can bind contaminants in smoke, such as non-polar compounds. An adsorptive agent described herein can bind tar from the smoke, thereby substantially removing it from an air stream.

A filtration agent and an adsorptive agent for use in such method can be as described above.

Contaminants removed from smoke in such method can be any compound described above.

A filtration agent described herein can be used in conjunction with a water pipe or hookah.

A water pipe, or hookah, has been used for centuries to smoke both plain and flavored tobaccos, mixtures of various aromatic herbs and spices, or mixtures of both. Typically a water pipe comprises a bowl, in which tobacco is combusted, mounted on top of a reservoir structure, the interior of which is at least partially filled with water. A tubular hollow stem extends from the bowl into the reservoir with a lowermost extremity immersed in the water. The interior portion of the reservoir structure above the level of the water forms a chamber into which smoke may be collected. One or more flexible hoses extend outward from the smoke collection portion of the interior of the reservoir.

Smoke contaminants from any plant material typically combusted in a water pipe or hookah can be removed according to the compositions and methods described herein. As an example, contaminants from tobacco smoke can be removed according to the compositions and methods described herein. As another example, contaminants from marijuana (e.g., medical marijuana) smoke can be removed according to the compositions and methods described herein. As the plant material burns, the smoke passes through the filtration agent comprising an adsorptive agent. As the smoke contacts the filtration agent, an adsorptive agent can adsorb contaminant.

In some embodiments, the plant material is combusted through use of indirect heat. Lit coals can be placed on top of a foil, which is placed over the bowl of tobacco, and through indirect heat "cooks" the tobacco to a temperature that produces smoke, but does not burn.

In some embodiments, the plant material is combusted through use of direct heat, wherein the plant material is directly lit and burns to produce smoke, such as in a cigarette or water pipe.

When using an indirect heat hookah, dried plant material is usually covered with a screen and a combustible material, such as a disc of quick-lighting charcoal, is placed on top of the screen and lit. A user can inhale through a hose attached to the water pipe, which draws air down through the lit charcoal and plant material, causing the production of smoke from the combustion of the plant material. When using a direct heat water pipe, dried plant material is lit directly in a bowl. A user can inhale through a hose attached to the water pipe, which draws air down through the burning plant material, causing the production of smoke. As the user inhales through, for example, a hose, the smoke passes from the bowl down the tubular hollow stem and through one or more water reservoirs, then out through the hose where the smoke reaches the user. Variations of the above process can be employed.

A filtration agent described herein can be introduced to water or a water of reservoir of a pipe or hookah. A filtration agent described herein can be included in one or more water reservoirs of a water pipe. A filtration agent can be added before, during, or after water is introduced into the reservoir, or some combination thereof. In a water pipe or hookah having a plurality of water reservoirs, a filtration agent can be included in one or more of such reservoirs. The same or differing formulations of filtration agents can be used in different reservoirs.

As the smoke passes through the water, the smoke can contact the filtration agent. Smoke, in a gaseous or vapor phase, can effectively interact with a non-polar (or non-polar and nonionic) adsorptive agent of the filtration agent. As smoke contacts the filtration agent, various components having affinity for the adsorptive agent can be bound and thereby removed from smoke. Components of smoke bound by an adsorptive agent can be as described above. Preferably, the adsorptive binds tar, effectively removing it from the smoke to be inhaled by a user.

Additional amounts of the same or different filtration agent can be added at any time during use of the water pipe or hookah.

A filtration agent described herein can be used to remove contaminants from smoke in a variety of smoking devices including, but not limited to, those described in: U.S. Pat. No. Des. U.S. Pat. No. Des. D342,805; U.S. Pat. No. Des. D349,780; U.S. Pat. No. Des. D350,411; U.S. Pat. No. Des. D358,227; U.S. Pat. No. Des. D358,228; U.S. Pat. No. Des. D358,229; U.S. Pat. No. Des. D376,033; U.S. Pat. No. Des. D368,325; U.S. Pat. No. Des. D381,116; U.S. Pat. No. Des. 403,106; U.S. Pat. No. Des. D547,902; U.S. Pat. No. Des. D547,489; U.S. Pat. No. Des. D539,978; U.S. Pat. No. Des. D548,398; U.S. Pat. No. Des. D554797; U.S. Pat. No. Des. D561388; U.S. Pat. No. Des. D558,919; U.S. Pat. No. Des. D584853; U.S. Pat. No. Des. D584853; U.S. Pat. No. 4,031,906; U.S. Pat. No. 4,111,214; U.S. Pat. No. 4,133,318; U.S. Pat. No. 4,148,326; U.S. Pat. No. 4,148,327; U.S. Pat. No. 4,170,237; U.S. Pat. No. 4,171,703; U.S. Pat. No. 4,183,365; U.S. Pat. No. 4,216,785; U.S. Pat. No. 4,203,455; U.S. Pat. No. 4,223,686; U.S. Pat. No. 4,241,741; U.S. Pat. No. 4,253,475; U.S. Pat. No. 4,171,703; U.S. Pat. No. 4,357,948; U.S. Pat. No. 4,414,988; U.S. Pat. No. 4,638,815; U.S. Pat. No. 4,865,056; U.S. Pat. No. 5,476,110; U.S. Pat. No. 5,080,113; U.S. Pat. No. 6,073,632; U.S. Pat. No. 6,568,400; U.S. Pat. No. 7,287,530; U.S. Pat. No. 7,404,405; each of which are incorporated herein by reference in their entirety. Other variations of a smoking device useful with the present filtration agent will be understood in the art and methods described herein adapted accordingly.

The amount of filtration agent used can be selected according to factors including, but not limited to: binding capacity of a filtration agent or component thereof; binding affinity of a filtration agent or component thereof; volume of water in a reservoir of a water pipe; number of reservoirs of a water pipe; quantity of combusted plant material; and quality of combusted plant material.

An amount of filtration agent can be selected according to the volume of water used. In some embodiments, a filtration agent can be present in the water in an amount of at least about 0.2 grams per liter of water. For example, a filtration agent can be present in the water in an amount of at least about 0.4 grams per liter of water; at least about 0.6 grams per liter of water; at least about 0.8 grams per liter of water; at least about 1 gram per liter of water; at least about 1.5 grams per liter of water; at least about 2 grams per liter of water; at least about 2.5 grams per liter of water; at least about 3 grams per liter of water; at least about 3.5 grams per liter of water; at least about 4 grams per liter of water; at least about 4.5 grams per liter of water; at least about 5 grams per liter of water; at least about 5.5 grams per liter of water; at least about 6 grams per liter of water; at least about 6.5 grams per liter of water; at least about 7 grams per liter of water; at least about 7.5 grams per liter of water; at least about 8 grams per liter of water; at least about 8.5 grams per liter of water; at least about 9 grams per liter of water; at least about 9.5 grams per liter of water; or at least about 10 grams per liter of water.

As another example, a filtration agent can be present in the water in an amount of at least about 0.5 grams per liter of water up to about 10 grams per liter of water. As another example, a filtration agent can be present in the water in an amount of at least about 1 grams per liter of water up to about 9 grams per liter of water. As another example, a filtration agent can be present in the water in an amount of at least about 2 gram per liter of water up to about 8 grams per liter of water. As another example, a filtration agent can be present in the water in an amount of at least about 3 grams per liter of water up to about 7 grams per liter of water. As another example, a filtration agent can be present in the water in an amount of at least about 4 grams per liter of water up to about 6 grams per liter of water.

An amount of filtration agent can be selected according to an amount of plant material combusted, an estimated amount of tar therein, or a combination thereof. Tobacco can contain, for example, about 25 mg tar to about 35 mg of tar per 2 g of tobacco (equivalent to about one cigarette).

In some embodiments, an adsorptive agent of the filtration agent can bind at least about 10 mg tar per 1 g of adsorptive agent. For example, an adsorptive agent can bind at least about 12 mg tar per 1 g of adsorptive agent; at least about 14 mg tar per 1 g of adsorptive agent; at least about 16 mg tar per 1 g of adsorptive agent; at least about 18 mg tar per 1 g of adsorptive agent; at least about 20 mg tar per 1 g of adsorptive agent; at least about 22 mg tar per 1 g of adsorptive agent; at least about 24 mg tar per 1 g of adsorptive agent; at least about 26 mg tar per 1 g of adsorptive agent; at least about 28 mg tar per 1 g of adsorptive agent; at least about 30 mg tar per 1 g of adsorptive agent; at least about 32 mg tar per 1 g of adsorptive agent; at least about 34 mg tar per 1 g of adsorptive agent; at least about 36 mg tar per 1 g of adsorptive agent; at least about 38 mg tar per 1 g of adsorptive agent; at least about 40 mg tar per 1 g of adsorptive agent; or more. In one embodiment, an adsorptive agent can bind at least about 20 mg tar per 1 g of adsorptive agent (see e.g., Examples 1 and 2). Preferably, an adsorptive agent can bind at least about 30 mg tar per 1 g of adsorptive agent.

For example, where tobacco contains about 25 mg tar per 2 g tobacco, and 1 g of adsorptive agent can bind at least about 40 mg tar, then an amount of filtration agent containing about 0.3 g adsorptive agent can be used for every 1 g of tobacco combusted. Where tobacco contains about 30 mg tar per 2 g tobacco, and 1 g of adsorptive agent can bind at least about 40 mg tar, then an amount of filtration agent containing about 0.4 g adsorptive agent can be used for every 1 g of tobacco combusted. Where tobacco contains about 35 mg tar per 2 g tobacco, and 1 g of adsorptive agent can bind at least about 40 mg tar, then an amount of filtration agent containing about 0.45 g adsorptive agent can be used for every 1 g of tobacco combusted.

For example, where tobacco contains about 25 mg tar per 2 g tobacco, and 1 g of adsorptive agent can bind at least about 30 mg tar, then an amount of filtration agent containing about 0.42 g adsorptive agent can be used for every 1 g of tobacco combusted. Where tobacco contains about 30 mg tar per 2 g tobacco, and 1 g of adsorptive agent can bind at least about 30 mg tar, then an amount of filtration agent containing about 0.5 g adsorptive agent can be used for every 1 g of tobacco combusted. Where tobacco contains about 35 mg tar per 2 g tobacco, and 1 g of adsorptive agent can bind at least about 30 mg tar, then an amount of filtration agent containing about 0.58 g filtration agent can be used for every 1 g of tobacco combusted.

In some embodiments, an amount of filtration agent containing at least about 0.1 g of filtration agent is used for about 1 g of tobacco. For example, an amount of filtration agent containing at least about 0.2 g of adsorptive agent can used for about 1 g of tobacco; at least about 0.3 g of adsorptive agent can used for about 1 g of tobacco; at least about 0.4 g of adsorptive agent can used for about 1 g of tobacco; at least about 0.5 g of adsorptive agent can used for about 1 g of tobacco; at least about 0.6 g of adsorptive agent can used for about 1 g of tobacco; at least about 0.7 g of adsorptive agent can used for about 1 g of tobacco; at least about 0.8 g of adsorptive agent can used for about 1 g of tobacco; at least about 0.9 g of adsorptive agent can used for about 1 g of tobacco; at least about 1 g of adsorptive agent can used for about 1 g of tobacco; at least about 1.1 g of adsorptive agent can used for about 1 g of tobacco; at least about 1.2 g of adsorptive agent can used for about 1 g of tobacco; at least about 1.3 g of adsorptive agent can used for about 1 g of tobacco; at least about 1.4 g of adsorptive agent can used for about 1 g of tobacco; at least about 1.5 g of adsorptive agent can used for about 1 g of tobacco; at least about 1.6 g of adsorptive agent can used for about 1 g of tobacco; at least about 1.7 g of adsorptive agent can used for about 1 g of tobacco; at least about 1.8 g of adsorptive agent can used for about 1 g of tobacco; at least about 1.9 g of adsorptive agent can used for about 1 g of tobacco; or at least about 2 g of adsorptive agent can used for about 1 g of tobacco.

In some embodiments, an amount of filtration agent containing at least about 0.1 g to about 1 g of adsorptive agent is used for about 1 g of tobacco. For example, an amount of filtration agent containing at least about 0.2 g to about 0.8 g of adsorptive agent is used for about 1 g of tobacco; at least about 0.3 g to about 0.7 g of adsorptive agent is used for about 1 g of tobacco; or at least about 0.4 g to about 0.6 g of adsorptive agent is used for about 1 g of tobacco.

Various indicators can be used to determine an amount of filtration agent to use in a water pipe application. For example, a colorometric indicator of the filtration agent can provide feedback as to the quantity and rate of contaminant binding. As another example, a density indicator of the filtration (e.g., whether a filtration agent or component thereof sinks, floats, or is suspended) can provide feedback as to the quantity and rate of contaminant binding.

A filtration agent can be removed from a water reservoir of a water pipe or hookah. For example, a filtration agent can filtered or strained from the water. As another example, a filtration agent can be removed with all or a portion of the water. A used filtration agent can be discarded by any suitable method. A used filtration agent can be filtered or strained from the water and discarded separately. A used filtration agent can be discarded along with all or some of the water. Safety measures appropriate for the level of contaminants on the used filtration agent can be employed.

Use of a filtration agent described herein can increase the smoothness of inhaled smoke. Use of a filtration agent described herein can decrease the acidity of inhaled smoke. Use of a filtration agent described herein can make smoke from a combusted plant material easier to inhale. Factors such as smoothness of inhaled smoke, smoke acidity, and ease of inhalation can be measured according to methods known in the art. For example, smoothness of inhaled smoke can be determined according to a survey of subjects (e.g., about 10 to about 50 subjects) ranking smoothness of inhaled smoke according to an empirical scale (see e.g., Example 3). As another example, smoke acidity can be measured according to the level of one or more marker compounds in the smoke. A marker compound can be any compound associated with an acrid character in smoke including, but not limited to, the listing of contaminants above. As another example, smoke acidity can be measured according feedback of subjects (e.g., about 10 to about 50 subjects) ranking acridity of smoke according to an empirical scale.

In some embodiments, use of a filtration agent described herein reduces smoke acridity by at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95%.

In some embodiments, use of a filtration agent described herein increases smoothness of smoke at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95%.

In some embodiments, use of a filtration agent described herein increases ease of smoke inhalation by at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95%.

Another aspect provides kits suitable for removal of contaminants from an air stream. Such kits can include a filtration agent described herein and, in certain embodiments, instructions for use. Various embodiments of the kit can facilitate performance of the methods described herein, for example, removal of contaminants from smoke. When supplied as a kit, different components of the composition can be packaged in a ready to use form or as separate components to be combined just before use. Kit components can include, but are not limited to, a filtration agent as discussed herein, combustible plant material, a disposal bag, a flame source, disposable gloves, coloring agents, flavoring agents, aesthetic additives, pH buffers, charcoal, hookah screens, bowls, pipe components, or other materials conventionally used with water pipes or hookahs.

Packaging of the components can, if desired, be presented in a pack or dispenser device which can contain one or more applications. The pack may, for example, comprise paper, cloth, metal, or plastic covering. Such packaging of the components separately can also, in certain instances, permit long-term storage without losing activity of the components.

In some embodiments, kits can be supplied with instructional materials. Instructions can be printed on paper or other substrate, or can be supplied as an electronic-readable medium, such as a floppy disc, mini-CD-ROM, CD-ROM, DVD-ROM, Zip disc, videotape, audio tape, and the like. Detailed instructions do not have to be physically associated with the kit; instead, a user can be directed to, for example, an Internet web site specified by the manufacturer or distributor of the kit.

In some embodiments, the numbers expressing quantities of ingredients, properties such as molecular weight, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

In some embodiments, the terms "a" and "an" and "the" and similar references used in the context of describing a particular embodiment of the invention (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

All publications, patents, patent applications, and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present invention.

Having described the invention in detail, it will be apparent that modifications, variations, and equivalent embodiments are possible without departing the scope of the invention defined in the appended claims. Furthermore, it should be appreciated that all examples in the present disclosure are provided as non-limiting examples.

EXAMPLES

The following non-limiting examples are provided to further illustrate the present invention. It should be appreciated by those of skill in the art that the techniques disclosed in the examples that follow represent approaches the inventors have found function well in the practice of the invention, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the invention.

Example 1

Non-polar, nonionic adsorptive material (Amberlite XAD2 beads) was added to the water in a water pipe and tobacco was smoked through the water pipe. After smoking the tobacco, the beads were removed from the water by filtration and allowed to air dry. A portion of the beads was extracted 6 times with 0.1 mL of diethyl ether for each extraction. The 6 ether extracts were evaporated to dryness to yield a yellow brown, oily residue. The results are shown below in Table 1.

TABLE 1

| | Example 1 |
|---|---|
| Weight of beads extracted | 375.545 mg |
| Weight of residue extracted | 7.23 mg |
| Extraction ratio (mg of residue/g of beads extracted) | 19.25 mg residue extracted/g of beads extracted |

Example 2

Tobacco smoke residue binding was analyzed for unused so-called "virgin" beads, beads used in a water, and water in the absence of beads. Methods are according to those described in Example 1 unless specified otherwise.

"Virgin" (unsmoked) beads released 3.7 mg/g of ether-extractable residue. This figure represents a baseline of extractables. Beads from a water pipe through which tobacco was smoked released 24.3 mg/g of ether-extractable residue, i.e., tar.

Water (not containing beads) from a water pipe through which tobacco was smoked released 1.7 mg/g of ether-extractable residue, i.e., tar.

Based on the results presented above, 20.6 mg tar per gram of beads was captured in a water pipe application. Thus, the beads have over twelve times the tar-holding capacity of water alone.

Example 3

The following example tests the impact of a filtration agent on perceived smoothness of smoke and smoke treated by product.

Forty three subjects participated in a blinded study. Smokers were to inhale smoke of two different waterpipes (regular waterpipe smoke ("control") or waterpipe smoke treated with filtration agent ("experimental")) containing the same amount of tobacco, prepared and lit in the same manner.

Filtration agent was a hydrophobic crosslinked polystyrene copolymer resin in the form of a hard, spehrical opaque bead, 55% solid, a porosity of 0.41 mL pore/mL bead; 20-60 mesh; minimum surface area of 330 m$^2$/g; mean pore diameter 90 Å; true wet density 1.02 g/L; skeletal density 1.08 g/mL; bulk density 640 g/L (CAS#9060-05-3; XAD-2 Amberlite; Sigma-Aldrich, Inc.). One gram of filtration agent was placed into a water bowl containing about 10 ounces of water. The filtration agent, water in the water bowl, tobacco, and lighting agent were changed before each subject.

Smokers were not informed there was any difference between the two pipes but were to simply rate the smoothness of each on a scale of 1-10. Subjects rated smoothness of a first inhalation on a scale from 1-10, waited two minutes before a second inhalation and rated that one as well. Data was then analyzed.

Results showed that forty of forty-three subjects reported that smoke from the waterpipe treated with product was smoother, with the remaining three subjects reporting no difference. On a scale of 1-10, with one (1) being very harsh and ten (10) being very smooth, the mean rating for the control waterpipe was 5.12 while the mean rating for the waterpipe treated with product was 7.56, representing a difference of 2.44. Results are shown in FIG. 1. 84% of participants rated the difference as two points or higher.

The above results indicate a noticeable difference between regular waterpipe smoke and smoke treated with product. Thus removal of significant tars cause smoke to be less harsh and more pleasant for a smoker.

Example 4

A series of materials are tested for absorption of tobacco smoke residue. Methods are as described above in Example 1-2, unless otherwise indicated. One sample is about 375 mg of non-polar beads (Aldrich 426962; or Aldrich 426989) added to the water. A second sample is a mixture of about 200 mg of non-polar, nonionic beads (Amberlite XAD2) and about 200 mg non-polar beads (Aldrich 426962 or Aldrich 426989). A third sample is a mixture of about 400 mg of non-polar, nonionic beads (Amberlite XAD2) and about 400 mg non-polar beads (Aldrich 426962 or Aldrich 426989). Diethyl ether extracts are tested as above. The second and third samples explore the effect of amount of beads and effectiveness so as to provide guidance as to an amount of beads recommended for use in various protocols. If the amount of tar/beads is about the same between the second and third samples, then the beads may be saturated to capacity and more can be used. If the amount of tar/beads is higher in the second sample than in the third sample, then depending on the magnitude of difference, lower amounts of beads may be used.

What is claimed is:

1. A method for removing a contaminant from an air stream comprising:
    combusting a plant material to produce smoke; and
    contacting a filtration agent with the smoke;
    wherein
    the filtration agent comprises an adsorptive agent having an affinity for a non-polar compound present in smoke from a combusted plant material;
    the adsorptive agent substantially adsorbs non-polar contaminants from the smoke; and
    the adsorptive agent comprises at least one of a poly(4-ethylstyrene-co-divinylbenzene) polymer; a poly(styrene-co-divinylbenzene) polymer; or a styrene/divinylbenzene polyaromatic polymer.

2. The method of claim 1, wherein the plant material is a tobacco or a medical marijuana.

3. The method of claim 1, wherein the filtration agent comprises a plurality of adsorptive agents.

4. The method of claim 1, wherein the filtration agent comprises an adsorptive agent having an affinity for a non-polar non-ionic compound present in smoke from a combusted plant material.

5. The method of claim 1, wherein the adsorptive agent material comprises:
    (i) at least two of a poly(4-ethylstyrene-co-divinylbenzene) polymer; a poly(styrene-co-divinylbenzene) polymer; or a sytrene/divinylbenzene polyaromatic polymer; or
    (ii) a poly(4-ethylstyrene-co-divinylbenzene) polymer; a poly(styrene-co-divinylbenzene) polymer; and a sytrene/divinylbenzene polyaromatic polymer.

6. The method of claim 1, wherein the adsorptive agent comprises a material having a size of:
    (i) at least about 1 μm;
    (ii) up to about 10,000 μm;
    (iii) at least about 1 μm up to about 10,000 μm; at least about 10 μm up to about 8,000 μm; at least about 100 μm up to about 5,000 μm; at least about 200 μm up to about 2,000 μm; or at least about 250 μm up to about 1,200 μm; or
    (v) at least about 20 mesh up to about 50 mesh.

7. The method of claim 1, wherein the filtration agent comprises:
    at least one of a color agent, a pH buffer, or a flavor agent;
    wherein, if a color agent is present, the filtration agent changes color according to an amount of tar bound.

8. The method of claim 1, wherein the filtration agent comprises:
    (i) a material having a density less than water;
    (ii) a material having a density about the same as water; or
    (iii) a material having a density greater than water.

9. The method of claim 1, wherein the filtration agent comprises a material that is
   (i) substantially non-water solvent; or
   (ii) substantially non-toxic or ingestable.

10. The method of claim 1, wherein the filtration agent comprises an adsorptive material that binds at least one tobacco smoke contaminant selected from the group consisting of an alkane, an alkene, a cycloalkane, an aromatic, a polycyclic aromatic, and a terpene hydrocarbon.

11. The method of claim 10, having one or more of the following features:
   the alkane is selected from the group consisting of $C_8H_{18}$, $C_9H_{20}$, $C_{10}H_{22}$, $C_{11}H_{24}$, $C_{12}H_{26}$, $C_{13}H_{28}$, $C_{14}H_{30}$, $C_{15}H_{32}$, $C_{16}H_{34}$, $C_{17}H_{36}$, $C_{18}H_{38}$, $C_{19}H_{40}$, $C_{20}H_{42}$, $C_{21}H_{44}$, $C_{22}H_{46}$, $C_{23}H_{48}$, $C_{24}H_{50}$, $C_{25}H_{52}$, $C_{26}H_{54}$, $C_{27}H_{56}$, and $C_{28}H_{58}$;
   the alkene or cycloalkane is selected from the group consisting of $C_9H_{18}$, $C_{10}H_{20}$, $C_{11}H_{22}$, $C_{12}H_{24}$, $C_{13}H_{26}$, $C_{14}H_{28}$, $C_{15}H_{30}$, $C_{16}H_{32}$, $C_{17}H_{34}$, $C_{18}H_{36}$, $C_{19}H_{38}$, $C_{20}H_{40}$, $C_{21}H_{42}$, $C_{22}H_{44}$, $C_{23}H_{46}$, $C_{24}H_{48}$, $C_{25}H_{50}$, $C_{26}H_{52}$, $C_{27}H_{54}$, and $C_{28}H_{56}$;
   the aromatic is selected from the group consisting of $C_7H_8$, $C_8H_{10}$, $C_9H_{12}$, $C_{11}H_{16}$, $C_{12}H_{18}$, $C_{13}H_{20}$, $C_{14}H_{22}$, $C_{15}H_{24}$, $C_{16}H_{26}$, $C_{17}H_{28}$, $C_{18}H_{30}$, $C_{19}H_{32}$, $C_{20}H_{34}$, $C_8H_8$, $C_9H_{10}$, $C_{10}H_{12}$, $C_{11}H_{14}$, $C_{12}H_{16}$, $C_{13}H_{18}$, $C_{14}H_{20}$, $C_{15}H_{22}$, and $C_{16}H_{24}$;
   the polycyclic aromatic is selected from the group consisting of $C_nH_{2n-12}$, $C_nH_{2n-14}$, $C_nH_{2n-16}$, $C_nH_{2n-18}$, $C_nH_{2n-20}$, $C_nH_{2n-22}$, napthalene, biphenyl, acenaphthene, alkenylnapthalene, fluorene, dihydroanthracene, dihydrophenanthrene, anthracene, phenanthrene, alkenylanthracene, alkenylphenanthrene, fluoranthene, and pyrene; or the terpene is selected from the group consisting of $C_{10}H_{16}$, $C_{15}H_{24}$, $C_{20}H_{38}$, $C_{20}H_{30}$, caniphene, α-fenchene, α-terpinene, d-limonene, α-terpinolene, Z-β-ocimene, γ-terpinene, β-elemene, γ-elemene, α-farnesene, thujopsene, and δ-gurjunene.

12. The method of claim 1, wherein the filtration agent comprises an adsorptive agent that binds at least one medical marijuana smoke contaminant selected from the group consisting of an alkane, an alkene, a cycloalkane, an aromatic, a polycyclic aromatic, and a terpene hydrocarbon.

13. The method of claim 12, having one or more of the following features:
   the alkane is selected from the group consisting of pentadecane, heptadecane, hexadecane, octadecane, heneicosane, nonadecane, docosane, tricosane, hexacosane, heptacosane, and eicosane;
   the alkene is selected from the group consisting of nonadecene, (Z)-3-hexadecene, 1-pentadecene, 1-nonadecene, 1-octadecene, 3-eicosene, (Z)-9-tricosene, and (E)-3-eicosene;
   the cycloalkane is selected from the group consisting of cyclododecane, cyclohexadecane, 1,7,11-trimethyl-cyclotetradecane, and 1-(1,5-dimethylhexyl)-cyclohexane;
   the polycyclic aromatic is selected from the group consisting of pyrene, benzo [a] fluorene, benzo [a] anthracene, chrysene, benzo [j] fluoroanthene, benzo [k] fluoranthene, benzo [a] pyrene, perylene, dibenz [a, i] anthracene, benzo [ghi] perylene, anthranthene, and 2 dibenzopyrenes; or
   the terpene is caryophyllene.

14. The method of claim 1, wherein the adsorptive agent material does not bind at least one of nicotine, tetrahydrocannabinol (THC), cannabidiol, or cannabinol.

15. The method of claim 1, wherein:
   (i) the filtration agent is present in an amount of at least about 0.2 grams per liter of water; at least about 0.4 grams per liter of water; at least about 0.6 grams per liter of water; at least about 0.8 grams per liter of water; at least about 1 gram per liter of water; at least about 1.5 grams per liter of water; at least about 2 grams per liter of water; at least about 2.5 grams per liter of water; at least about 3 grams per liter of water; at least about 3.5 grams per liter of water; at least about 4 grams per liter of water; at least about 4.5 grams per liter of water; at least about 5 grams per liter of water; at least about 5.5 grams per liter of water; at least about 6 grams per liter of water; at least about 6.5 grams per liter of water; at least about 7 grams per liter of water; at least about 7.5 grams per liter of water; at least about 8 grams per liter of water; at least about 8.5 grams per liter of water; at least about 9 grams per liter of water; at least about 9.5 grams per liter of water; or at least about 10 grams per liter of water; or
   (ii) the filtration agent is present in an amount sufficient to provide the adsorptive agent in an amount of at least about 0.5 grams per liter of water up to about 10 grams per liter of water; at least about 1 grams per liter of water up to about 9 grams per liter of water; at least about 2 gram per liter of water up to about 8 grams per liter of water; at least about 3 grams per liter of water up to about 7 grams per liter of water; or at least about 4 grams per liter of water up to about 6 grams per liter of water.

16. The method of claim 1, wherein the filtration agent comprises an adsorptive agent that can bind at least about 10 mg tar per 1 g of filtration agent; at least about 12 mg tar per 1 g of filtration agent; at least about 14 mg tar per 1 g of filtration agent; at least about 16 mg tar per 1 g of filtration agent; at least about 18 mg tar per 1 g of filtration agent; at least about 20 mg tar per 1 g of filtration agent; at least about 22 mg tar per 1 g of filtration agent; at least about 24 mg tar per 1 g of filtration agent; at least about 26 mg tar per 1 g of filtration agent; at least about 28 mg tar per 1 g of filtration agent; at least about 30 mg tar per 1 g of filtration agent; at least about 32 mg tar per 1 g of filtration agent; at least about 34 mg tar per 1 g of filtration agent; at least about 36 mg tar per 1 g of filtration agent; at least about 38 mg tar per 1 g of filtration agent; or at least about 40 mg tar per 1 g of filtration agent.

17. The method of claim 1, wherein
   (i) the filtration agent is present in an amount of at least about 0.1 g of adsorptive agent for about 1 g of tobacco; at least about 0.2 g of adsorptive agent for about 1 g of tobacco; at least about 0.3 g of adsorptive agent for about 1 g of tobacco; at least about 0.4 g of adsorptive agent for about 1 g of tobacco; at least about 0.5 g of adsorptive agent for about 1 g of tobacco; at least about 0.6 g of adsorptive agent for about 1 g of tobacco; at least about 0.7 g of adsorptive agent for about 1 g of tobacco; at least about 0.8 g of adsorptive agent for about 1 g of tobacco; at least about 0.9 g of adsorptive agent for about 1 g of tobacco; at least about 1 g of adsorptive agent for about 1 g of tobacco; at least about 1.1 g of adsorptive agent for about 1 g of tobacco; at least about 1.2 g of adsorptive agent for about 1 g of tobacco; at least about 1.3 g of adsorptive agent for about 1 g of tobacco; at least about 1.4 g of adsorptive agent for about 1 g of tobacco; at least about 1.5 g of adsorptive agent for about 1 g of tobacco; at least about 1.6 g of adsorptive agent for about 1 g of tobacco; at least about 1.7 g of adsorptive agent for about 1 g of tobacco; at least about 1.8 g of adsorptive agent for about 1 g of tobacco; at least about 1.9 g of adsorptive agent for about 1 g of tobacco; or at least about 2 g of adsorptive agent for about 1 g of tobacco; or (ii) the filtration agent is present in an amount of at least about 0.1 g to about 1 g of adsorptive agent for about 1 g of tobacco; at least about 0.2 g to about 0.8 g of adsorptive agent for about 1 g of tobacco; at least about 0.3 g to about 0.7 g of adsorptive agent for about 1 g of tobacco; or at least about 0.4 g to about 0.6 g of adsorptive agent for about 1 g of tobacco.

18. The method of claim 1, wherein:
(i) the filtration agent reduces smoke acridity by at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95%;
(ii) the filtration agent increases smoothness of smoke by at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95%; or
(iii) the filtration agent increases ease of smoke inhalation by at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95%.

19. A system for inhaling smoke from a combusted plant material comprising:
a bowl;
a stem pipe;
a water reservoir;
a filtration agent;
an inhalation tube;
optionally, a combustible plant material, wherein the combustible plant material is within the bowl when present; and
optionally, water, wherein the water fills the water reservoir to about a water line when present;
wherein,
the filtration agent comprises an adsorptive agent having an affinity for a non-polar compound present in smoke from a combusted plant material;
the adsorptive agent comprises at least one of a poly(4-ethylstyrene-co-divinylbenzene) polymer; a poly(styrene-co-divinylbenzene) polymer; or a styrene/divinylbenzene polyaromatic polymer; and
the bowl is fluidically connected to the stem pipe, the stem pipe extends below a water line of the water reservoir, the inhalation tube extends above the water line of the water reservoir, and the filtration agent is within the water reservoir.

* * * * *